| United States Patent [19] | [11] Patent Number: 4,876,547 |
|---|---|
| Franco | [45] Date of Patent: Oct. 24, 1989 |

[54] M.T.I. RADAR SYSTEM

[75] Inventor: Maurice Franco, Granada Hills, Calif.

[73] Assignee: Lockheed Corporation, Calabasas, Calif.

[21] Appl. No.: 243,755

[22] Filed: Sep. 13, 1988

[51] Int. Cl.[4] .......................................... G01S 13/52
[52] U.S. Cl. .................................... 342/160; 342/379
[58] Field of Search ............................... 342/160-162, 342/379-384

[56] References Cited

U.S. PATENT DOCUMENTS

| 3,916,325 | 10/1975 | Lund | 328/116 |
|---|---|---|---|
| 3,972,041 | 7/1976 | Howard | 342/89 |
| 3,973,260 | 8/1976 | Costantini et al. | 342/91 |
| 4,042,924 | 8/1977 | Evans et al. | 342/102 |
| 4,058,809 | 11/1977 | Chudleigh, Jr. | 342/92 |
| 4,062,011 | 12/1977 | Preston et al. | 342/94 |
| 4,070,675 | 1/1978 | Daniel et al. | 342/160 |
| 4,177,464 | 12/1979 | Masak | 343/100 |
| 4,250,506 | 2/1981 | McNaul | 342/367 |
| 4,266,226 | 5/1981 | McNaul et al. | 342/379 |
| 4,333,080 | 6/1982 | Collins et al. | 342/194 |
| 4,367,472 | 1/1983 | Hauptmann | 343/7 |
| 4,384,291 | 5/1983 | Lewis et al. | 342/196 |
| 4,394,658 | 7/1983 | Short | 342/160 |
| 4,431,999 | 2/1984 | Gutleber | 343/381 |
| 4,434,424 | 2/1984 | Old | 343/381 |
| 4,533,917 | 8/1985 | Reed | 343/379 |
| 4,554,548 | 11/1985 | Brilman | 343/379 |
| 4,566,011 | 1/1986 | Lewis et al. | 342/201 |
| 4,571,594 | 2/1986 | Haupt | 342/379 X |
| 4,618,863 | 10/1986 | Collins | 342/194 |
| 4,620,192 | 10/1986 | Collins | 342/128 |

OTHER PUBLICATIONS

Text entitled, "Radar Handbook" by Merrill Skolnik, McGraw Hill, 1970 Chapter entitled, "MTI Radar-IF Cancellers", pp. 17-32 to 17-37, and the bibliography on pp. 17-60, footnote No. 15.

Primary Examiner—Thomas H. Tarcza
Assistant Examiner—John B. Sotomayor
Attorney, Agent, or Firm—Alan Rose

[57] ABSTRACT

A moving target indication (MTI) radar which includes TACCAR circuitry or similar means for shifting the frequency of the transmitter/local oscillator, includes a main directional antenna, and subordinate antenna elements for detecting returns from sidelobe directions. The signals from the subordinate antenna elements are modulated, and modulated return pulses are identified and employed to eliminate false pseudo moving target signals which would otherwise be received from the side lobes of the main antenna.

15 Claims, 4 Drawing Sheets

M.T.I. RADAR SYSTEM

FIELD OF THE INVENTION

This invention relates to Moving Target Indication Radar Systems, with an emphasis on Airborne Moving Target Indication radars (AMTI).

BACKGROUND OF THE INVENTION

An important aspect of AMTI radar systems performance involves their capability of detecting airborne targets against high clutter backgrounds and in severe jamming environments; and this capability is a direct function of their antenna mainlobe-to-sidelobe response ratio. Since targets in the main beam can have extremely small radar cross sections, they must compete with clutter returns both in the main beam and in those side lobes which might occur in the same range cell as the target. With high or medium pulse repetition frequency (PRF) doppler radar mechanizations, close-in, strong sidelobe clutter returns can totally obscure targets at longer ranges because of their inherent range ambiguity. In low PRF systems, where range is unambiguous, the target in the main beam needs only to compete with sidelobe clutter which occurs at the same range. However, strong fixed sidelobe clutter discrete signals at other ranges are frequently detected and will be treated as bona fide moving targets because of the AMTI/time averaged clutter coherent airborne radar (TACCAR) mechanization typically employed in such radars for minimizing beam clutter spread and thus, they will be tracked until their lack of target validity is established. This is a significant problem in such radars due to these sidelobe discrete signals overloading the track processor.

Incidentally, TACCAR mechanizations are well known, and are discussed for example in the following text, entitled "Radar Handbook" by Merrill Skolnik, McGraw Hill, 1970, in the chapter entitled "MTI Radar-IF Cancellers", see pp. 17-32 to 17-37, and the bibliography on page 17-60, in which attention is particularly directed to footnote No. 15, the article referenced on page 17-32.

Briefly, TACCAR, or Time Averaged Clutter Coherent Airborne Radar, involves clutter rejection in the main beam of the antenna, through a clutter referencing process, which locks the main beam clutter to the pulse repetition frequency (PRF) lines of the radar transmitting waveform. This is accomplished by driving the coherent or "stable" local oscillator (STALO) so as to always maintain the ground clutter spread around the pulse repetition lines (representing zero doppler shift). However, this has the effect of producing an artificially induced doppler shift in returns on the side lobes from stationary targets, and they will now appear as moving targets in the radar processor and will be tracked as bona fide targets. They will fluctuate tremendously and eventually will drop out of the tracker as false targets, but meanwhile they can create a serious computer overload situation. Incidentally, the use of the term and eventually will "coherent" with respect to the local oscillator is to be preferred as compared with the use of the term "stable", as its frequency is varied slightly, by the TACCAR process.

Of course, in the absence of the use of the STALO/-TACCAR process, the returns from stationary side lobe objects or clutter would be rejected by the normal moving target identification (MTI) process which cancels out returns which do not shift in position during successive scans, such as in ground-based MTI radars.

Accordingly, one principal object of the present invention is to identify and to reject those STALO/TACCAR induced false targets which arise from the sidelobe returns from fixed or stationary objects, in airborne MTI radars, and also, to apply the basic Sidelobe Discrimination technique to other types of radars in which rejection of any sidelobe clutter is important, including ground-based systems.

It is noted in passing that sidelobe discrimination methods have previously been proposed, in conventional directional antenna receiving systems, see U.S. Pat. No. 4,266,226, granted May 5, 1981, by way of example. However, the system disclosed in this patent does not address the radar system's problems. Normally, in conventional radar systems which do not use TACCAR/STALO mechanizations, the returns from fixed objects picked up by the sidelobes, could be eliminated by conventional moving target identification techniques, provided they are not of large amplitudes. In accordance with the present invention, radar systems utilizing TACCAR or similar processes are faced with the unusual situation that sidelobe fixed target returns are converted into spurious apparently moving targets; and the present invention involves the elimination of this problem.

SUMMARY OF THE INVENTION

In accordance with the present invention, a radar system which may include the STALO/TACCAR implementation as discussed above provides a coded modulation on the side lobe signals, and selectively inhibits any returns (targets) which carry this modulation.

In one preferred embodiment, auxiliary antennas are provided to receive returns from side lobe orientations, and modulation is applied to the signals received on these antennas. The main lobe signal return is fed through delay circuitry to a selective inhibit circuit, which is activated when modulated return signals are received on the auxiliary antennas, thereby eliminating the false sidelobe signals which would otherwise appear as real targets.

The modulation may be introduced in any suitable manner, but a diode disabling switch operated at the desired modulation frequency has been employed effectively.

Other objects, features, and advantages of the invention will become apparent from a consideration of the following detailed description and from the accompanying drawings.

DETAILED DESCRIPTION

Figure 1:
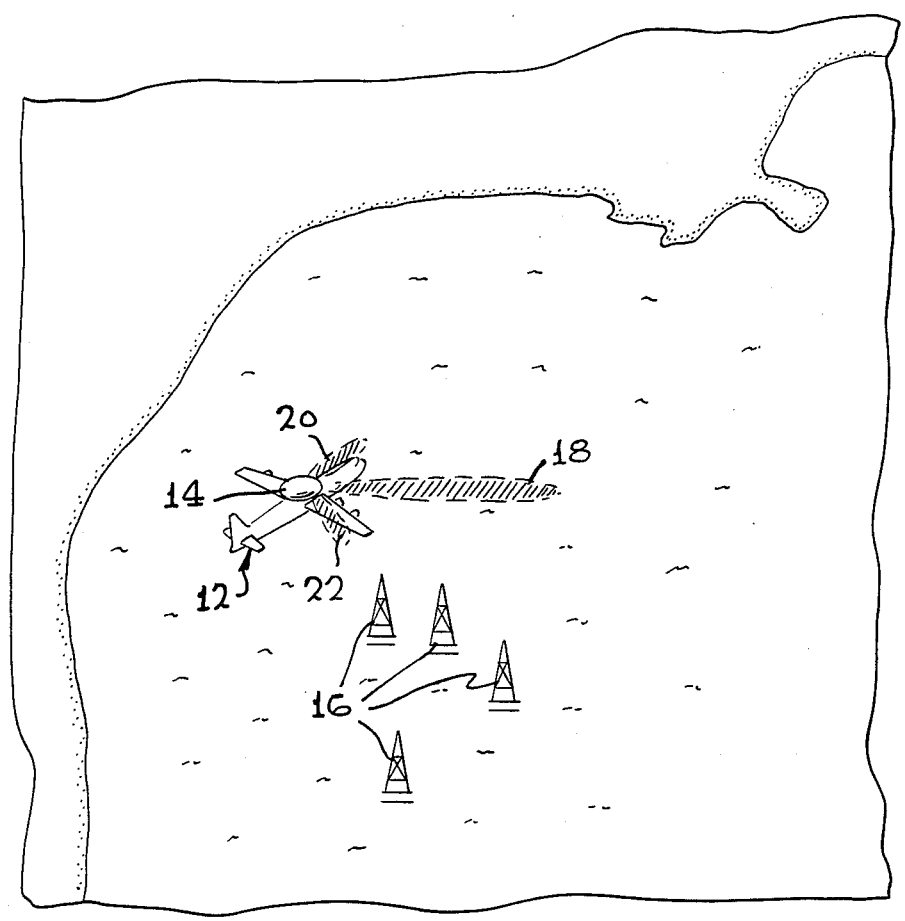
FIG. 1 is a schematic showing of an airborne early warning radar system showing an environment in which there is a need for the present invention, and in which it is particularly useful.

Referring more particularly to the drawings, FIG. 1 is a diagrammatic view of an Airborne Early Warning (AEW) aircraft 12 having a radar dome 14 on patrol duty for the U.S. Customs Service to prevent contraband goods from being smuggled into the United States. Shown in FIG. 1 are a number of off-shore drilling platforms or oil rigs 16. Now, with the radar system mounted in the aircraft 12 in operation, its antenna array is rotated so that its main beam 18 might be directed due east, while subordinate side lobes could be directed as indicated at 20 and 22, for example.

As noted above, the intruding targets in the main beam may well have an extremely small radar cross section, and it is important that they be detected against clutter returns, which may be from very prominent and sizeable objects, such as the oil rigs 16. In order to make the moving targets more readily identifiable in the presence of main-beam clutter, radar systems have in recent years included "Time Averaged Clutter Coherent Airborne Radar" (TACCAR) mechanizations, which lock the main beam clutter to the pulse repetition frequency lines of the radar transmitted waveform in the frequency domain. This is accomplished by driving or slightly shifting the frequency of the so-called "STALO" or "Stable Local Oscillator" so as to always maintain the ground clutter spread about the PRF lines (zero doppler shift). As the antenna rotates, the STALO is continuously controlled as a function of aircraft heading velocity and antenna pointing angle so that the clutter is shifted to the zero doppler point, or line.

Figure 2:
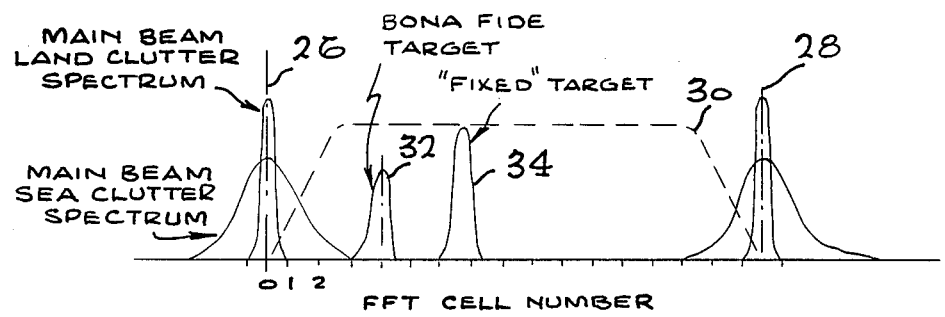
FIG. 2 is a diagrammatic showing potential interference with the operation of the moving target identification radar, by spurious signals resulting from strong fixed sidelobe returns.

In FIG. 2, the doppler spectrum of the airborne moving target indication radar is shown, with the TACCAR process in operation. The distance of the target from the pulse repetition frequency or PRF lines 26 and 28, or the FFT (Fast Fourier Transform) cell number, indicates the speed of the target. The airborne moving target indication response envelope is indicated by the dashed line 30, and a typical target might be indicated by the pulse 32.

However, as a result of the TACCAR process, fixed objects, such as the oil rigs 16, as shown in FIG. 1, may appear to be moving targets, when a return arrives from one of the side lobes. Such a return is indicated by the pulse 34, as shown in FIG. 2. In view of the fact that some of the objects, such as the huge oil rigs shown in FIG. 1, may have a very substantial radar cross-section for reflecting signals back to the radar, the sidelobe signals may be of substantial magnitude. Further, if there are a substantial number of these false sidelobe returns which appear to be bona fide moving targets, the computer processor may be overloaded, and unable to properly handle valid incoming targets.

The present invention involves the identification of such spurious signals, and the early discrimination or rejection of them, in a manner to be discussed below.

Figure 3:
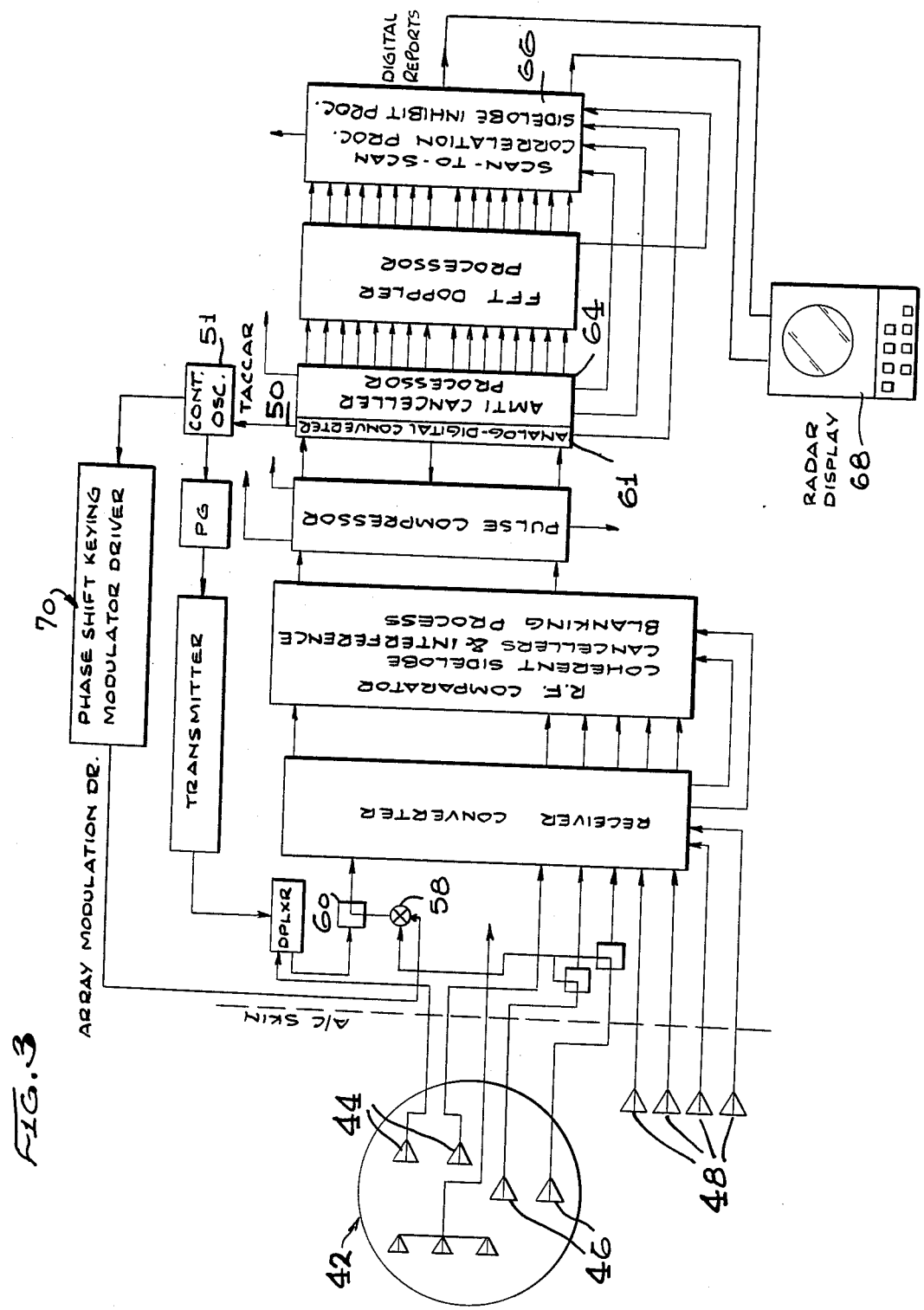
FIG. 3 is a block diagram of a typical radar system incorporating the principles of the present invention.

FIG. 3 discloses a typical AMTI radar system, modified to implement the principles of the present invention. More specifically, the rotodome 42 includes the principal directional array antenna 44 and the auxiliary antennas or antenna elements 46. Additional antennas 48 may also be employed. The radar system, as shown in FIG. 3, includes the TACCAR control signal on lead 50. The local oscillator, which is driven by or controlled by the TACCAR signal, is included in circuit block 51. The remainder of the radar system is devoted to the digital signal processing portion of the sidelobe inhibit process.

The signals from the auxiliary antennas 46, which include pickup from the sidelobe directions, are routed to the modulator 58, and the modulated signals are coupled to the main signals from the directional antenna 44 in the directional coupler 60. Signals from the directional coupler 60 are converted to digital form in the analog to digital converter 61, and are directed and to the AMTI digital delay line 64. The inhibit/reject circuit 66 checks all digital signal words received to determine whether or not they are modulated, and therefore are coming from the sidelobes, or not. If modulation is indeed detected, then the "SIDELOBE INHIBIT" circuit 66 is actuated, and the pulse is blocked from the radar processing circuitry and the radar display indicated by the block 68. This action would correspond to the elimination of the pulse 34 of FIG. 2, while a true target pulse 32, which would not be accompanied by modulation, would be allowed to pass through the "SIDELOBE INHIBIT" circuit 66. The modulation frequency of the diode switch included within the circuit 58 is controlled by the modulator 70. In one typical installation, the frequency of modulation, or of switching of the diode switch associated with the auxiliary antennas or antenna elements might be at an IF frequency of approximately 30 megahertz, while the operating frequency of a typical low PRF pulse doppler radar system might be in the order of 400–450 megahertz, and the pulse repetition rate might be in the order of 300 per second. A conventional frequency swept pulse or "chirp" can be employed. The use of digital coded pulse compression is the preferred method as the signals are readily coded and encoded in the more typical signal processing elements of current radars such as are depicted in FIG. 3. As noted above, FIG. 3 is a somewhat complete block circuit diagram of an AMTI radar system equipped with sidelobe rejection arrangements of the present invention. In general, those skilled in the radar art will readily recognize the circuit blocks from the legends included therein. The sidelobe inhibiting or rejection function is accomplished in block 66.

Figure 4:
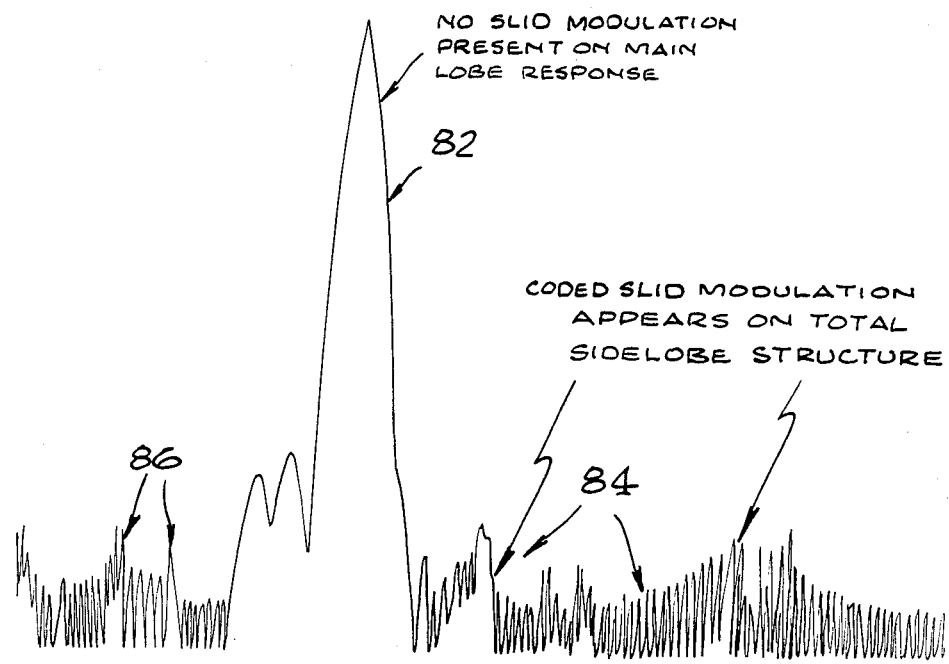
FIG. 4 shows how modulated signals are received on sidelobes while unmodulated signals are received on the main lobe of a directional antenna.

Referring now to FIG. 4 of the drawings, the result of modulation is shown graphically. More specifically, the return from the mainlobe direction, as indicated at 82, is virtually free of modulation, while returns on the sidelobes, as indicated at 84 and 86 may be readily identified by the hash or modulation, which is included in the return signals (either amplitude, phase or digitally coded).

Figure 5:
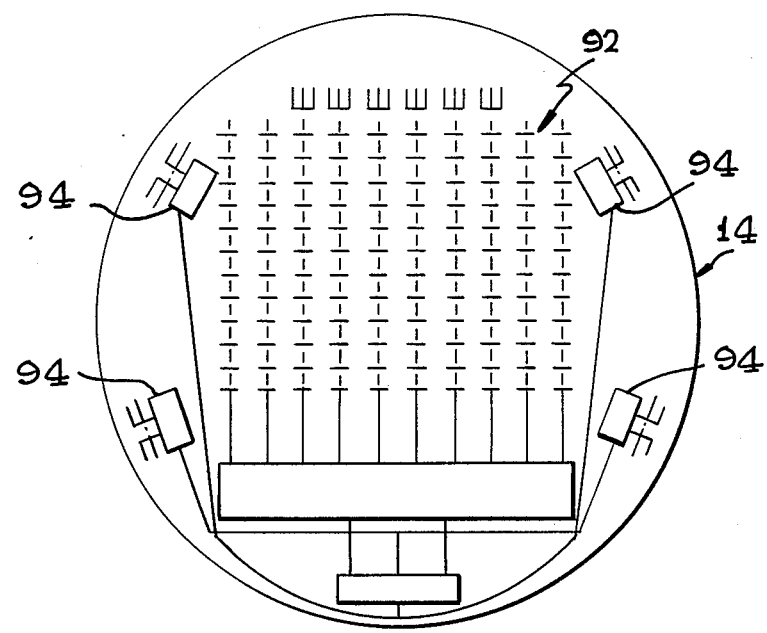
FIG. 5 shows an antenna array to which the present invention is applicable.
Figure 6:
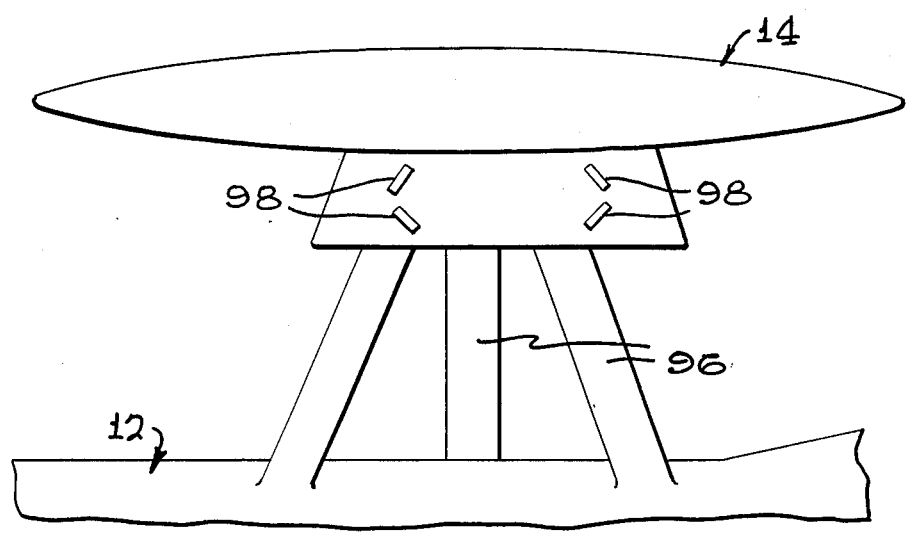
FIG. 6 is a side view of the mechanical mounting arrangements for the antenna array shown in FIG. 5.

For completeness, FIGS. 5 and 6 show one configuration of a radome which may be employed in the implementation of the present invention. More particularly, the radome 14 may include the multi-element directional antenna array 92, and the auxiliary antennas or antenna elements 94. The signals from the auxiliary antennas 94, together with the signals from the pylon antennas are modulated, as shown in FIG. 3 of the drawings. FIG. 6 shows the radome 14 with its supporting legs 96, and the additional fixed auxiliary antennas 98.

In conclusion, it is to be understood that the foregoing detailed description and the accompanying drawings relate to one illustrative embodiment of the invention. Other arrangements may be employed without departing from the spirit and scope of the invention. Thus, by way of example and not of limitation, other modulation arrangements may be employed, and the spurious modulated signals may be eliminated at other points in the system instead of in the RF section of the radar system. The input from the auxiliary antenna elements need not be coupled to the input from the mainlobe antenna, but may be sampled for modulation directly. Further, instead of using the delay circuitry, as shown at 64 in FIG. 3 of the drawings, the modulated pulses may be detected in the RF stages of the system and may be eliminated at a subsequent point in the data processing circuitry indicated at block 68. Also, other radar signal processing techniques may cause stationary target reflections from sidelobes to appear as moving targets; and the present invention would also be applicable to any such systems. Accordingly, the present invention is not limited to the arrangements precisely as shown in the drawings, and as set forth hereinabove in the Detailed Description.

What is claimed is:

1. A radar system comprising:
a main directional antenna, having maximum response in a mainlobe direction, and lesser levels of response from sidelobe directions;
radar system means for transmitting pulses from said main directional antenna, and for receiving reflected signals back from moving targets and clutter from stationary objects, from said antenna;
said radar system including a coherent local oscillator, and circuit means for driving said oscillator to maintain the ground clutter returns received from the mainlobe, spread about the pulse repetition frequency lines representing zero doppler shift; said circuit means affecting sidelobe returns from fixed objects so that they appear to be moving targets;
said system including auxiliary antenna elements for receiving signals from said sidelobe directions;
means for modulating signals received from said sibelobe directions from said auxiliary antenna elements, to the exclusion of signals received from the mainlobe direction;
said radar system including target data processing circuitry;
a delay circuit and a signal inhibit circuit coupling said directional antenna to said target data processing circuitry;
pulse sampling circuitry for identifying the presence of modulated return signals from fixed objects in the sidelobe directions; and
means for actuating said signal inhibit circuit to block delayed pulse signals from said directional antenna when said modulated signals are detected by said pulse sampling circuitry to eliminate false target signals received on said main directional antenna from side lobe returns.

2. A radar system as defined in claim 1 wherein means are provided for coupling signals received from said auxiliary antenna elements with signals received from said main directional antenna.

3. A radar system as defined in claim 2 wherein said coupling means is a directional coupler.

4. A radar system as defined in claim 1 wherein means are provided for mounting said radar system on an aircraft.

5. A system as defined in claim 1 wherein said circuit means includes TACCAR implementation.

6. A moving target indication radar system comprising:
a main directional antenna, having maximum response in a mainlobe direction, and lesser levels of response from sidelobe directions;
radar systems means for transmitting pulses from said main directional antenna, and for receiving reflected signals back from moving targets and clutter from stationary objects, from said antenna;
said radar system including a coherent local oscillator, and circuit means for shifting the frequency of said oscillator to improve the rejection of clutter returns received from the mainlobe; said circuit means affecting sidelobe returns from fixed objects so that they appear to be moving targets;
said system including auxiliary antenna elements for receiving signals from said sidelobe directions;
means for modulating signals received from said sidelobe directions from said auxiliary antenna elements, to the exclusion of signals received from the mainlobe direction;
said radar system including target data processing circuitry for determining the range and speed of target return signals;
said radar system including a signal inhibit circuit through which signals from said main directional antenna are transmitted;
pulse sampling circuitry for identifying the presence of modulated return signals from fixed objects in the sidelobe directions; and
means for actuating said signal inhibit circuit to block pulse signals received from said main directional antenna when said modulated signals are detected by said pulse sampling circuitry, to eliminate false target signals received on said main directional antenna from side lobe returns.

7. A radar system as defined in claim 6 wherein means are provided for coupling signals received from said auxiliary antenna elements with signals received from said main directional antenna.

8. A radar system as defined in claim 7 wherein said coupling means is a directional coupler.

9. A radar system as defined in claim 6 wherein means are provided for mounting said radar system on an aircraft.

10. A radar system as defined in claim 6 further including a delay circuit means in series with said signal inhibit circuit.

11. A system as defined in claim 6 wherein said circuit means includes TACCAR implementation.

12. An airborne radar system comprising:
a main directional antenna, having maximum response in a mainlobe direction, and lesser levels of response from sidelobe directions;
radar systems means for transmitting pulses from said main directional antenna, and for receiving reflected signals back from moving targets and clutter from stationary objects, from said antenna;
said radar system including circuit means for improving the rejection of ground clutter returns received from the mainlobe; said circuit means affecting sidelobe returns from fixed objects so that they appear to be moving targets;
said radar system including auxiliary antenna elements for receiving signals from said sidelobe directions;
means for modulating signals received from said sidelobe directions from said auxiliary antenna elements, to the exclusion of signals received from the mainlobe direction;

said radar system including target data processing circuitry;

said radar system including a signal inhibit circuit through which signals from said main directional antenna are transmitted;

pulse sampling circuitry for identifying the presence of modulated return signals from fixed objects in the sidelobe directions;

means for actuating said signal inhibit circuit to block pulse signals received from said main directional antenna when said modulated signals are detected by said pulse sampling circuitry, to eliminate false target signals received on said main directional antenna from side lobe returns; and means for mounting said radar system on an aircraft.

13. An airborne radar system as defined in claim 12 including radome means for supporting said main directional antenna.

14. A radar system as defined in claim 12 further including a delay circuit means in series with said signal inhibit circuit.

15. A system as defined in claim 12 wherein said circuit means includes TACCAR implementation.

* * * * *